United States Patent [19]

Lew

[11] Patent Number: 5,079,961
[45] Date of Patent: Jan. 14, 1992

[54] ROTAMETER WITH REMOTE READ-OUT DEVICE

[76] Inventor: Hyok S. Lew, 7890 Oak St., Arvada, Colo. 80005

[21] Appl. No.: 677,294

[22] Filed: Mar. 29, 1991

[51] Int. Cl.$^5$ .................................................. G01F 1/24
[52] U.S. Cl. .................................................. 73/861.56
[58] Field of Search ............ 73/861.55, 861.56, 861.57

[56] References Cited

U.S. PATENT DOCUMENTS

| | | | |
|---|---|---|---|
| 3,128,625 | 4/1964 | Heineman | 73/861.56 |
| 3,495,456 | 2/1970 | Ohno | 73/861.56 |
| 4,523,480 | 6/1985 | Inoue | 73/861.57 X |

Primary Examiner—Herbert Goldstein

[57] ABSTRACT

A flowmeter comprises a vertically disposed tapered flow passage with cross sectional area increasing from the bottom inlet to the top outlet of the tapered flow passage, a flow obstructing member disposed within the tapered flow passage in a suspended arrangement, an elongated member with one extremity affixed to the flow obstructing member and axially extending through the tapered flow passage and into an elongated cavity extending from one extremity of the tapered flow passage, a tapered first electrical coil disposed coaxially and exteriorly to the tapered flow passage, and a second electrical coil disposed coaxially and exteriorly to the elongated cavity; wherein the flow rate of fluid moving through the tapered flow passage is determined as a function of degree of mutual electrical induction between the two electrical coils.

20 Claims, 2 Drawing Sheets

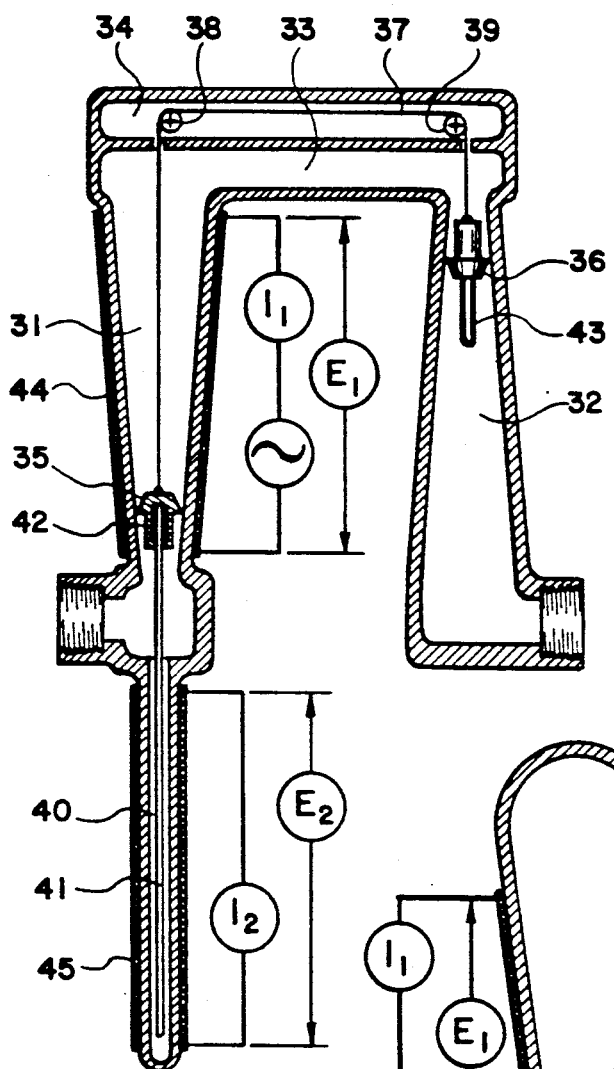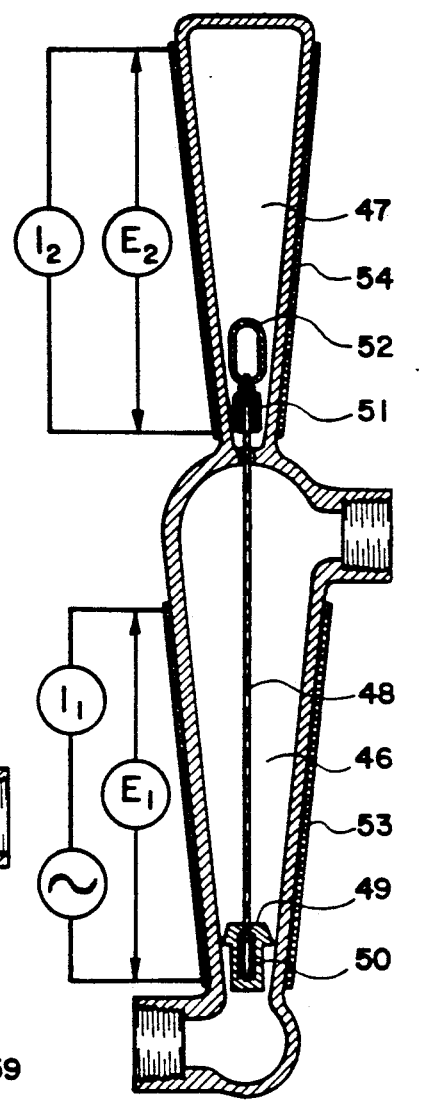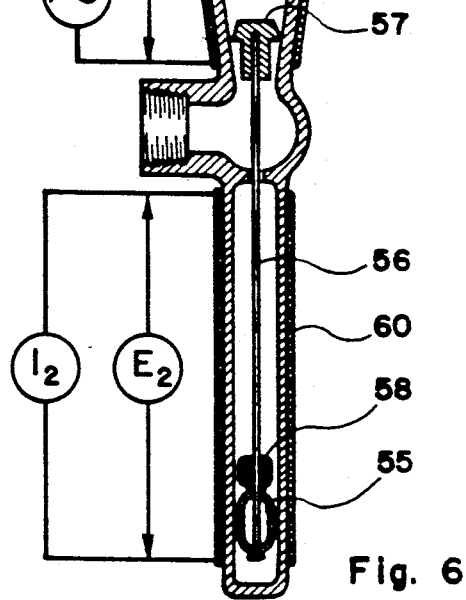

ROTAMETER WITH REMOTE READ-OUT DEVICE

BACKGROUND OF THE INVENTION

The rotameter is one of the simplest and yet most widely used flowmeters available today, which comprises a vertically disposed tapered flow passage a cross sectional area progressively increasing from the inlet at the to the outlet at the top and a flow obstructing member suspended in the stream wherein the drag force exerted by the upward moving fluid counter-balance the weight of the flow obstructing member. The flow rate of the fluid is determined from the vertical position of the flow obstructing member. The majority of rotameters, however, suffer a great deficiency: They almost exclusively use a visual read-out means consisting of a graduated glass window to measure the vertical position of the flow obstructing member as a measure of flow rate of the fluid, while a few versions employing a remotely readable means for indicating the vertical position of the flow obstructing member have poor accuracy and inadequate repeatability due to lack of precision in converting the physical position of the flow obstrucing member to an electrical signal by the transducer employed therein. Because of this shortcoming, rotameters available at the present time are unsuitable for many applications, wherein the output from the rotameter has to be used as an input to the flow controlling or flow handling devices. There is a need in industrial plants as well as in scientific laboratories for a rotameter with a remote read-out means that accurately and reliably provides the rate of fluid flow in the form of an electrical signal.

BRIEF SUMMARY OF THE INVENTION

The primary object of the present invention is to provide a rotameter a tapered input electrical coil disposed coaxially and exteriorly to the tapered flow passage of the rotameter including a suspended flow obstructing member, an output electrical coil disposed coaxially to the tapered input electrical coil in a shifted relationship, and a combination of a flow obstructing member and an elongated rod disposed coaxially within the tapered flow passage, that includes means for enhancing the mutual electrical induction the input and output electrical coils; wherein the degree of the mutual electrical induction between the input and output electrical coils varies as a function of the vertical position of the flow obstructing member, and the vertical position thereof is determined as a function of ratio between the input electrical signal supplied to the input electrical coil and the output electrical signal generated by the output electrical coil as a measure of the flow rate of fluid moving through the tapered flow passage.

Another object is to provide a rotameter described in the primary object of the present invention wherein the flow obstructing member slides over the elongated rod fixedly secured to the rotameter body and forming a core of the output electrical coil as the elongated rod engages a hole included in the flow obstructing member in a slidable and coaxial arrangement.

A further object is to provide a rotameter described in the primary object of the present invention wherein the elongated rod is affixed to the flow obstructing member at one extremity thereof, while the other extremity is terminated within the core of the output electrical coil, wherein the combination of the flow obstructing member and the elongated rod becomes a floating core electrically coupling the input and output electrical coils.

Yet another object is to provide a rotameter described in the primary object of the present invention wherein the flow obstructing member includes an intermediary electrical coil coaxially disposed about the elongated member.

Yet a further object is to provide a rotameter described in the primary object of the present invention wherein the combination of the flow obstructing member and the elongated rod includes an intermediary electrical coil with a first half disposed at one extremity of the elongated member and within the flow obstructing member and a second half disposed at the other extremity of the elongated member in a coaxial relationship to the elongated member.

Still another object is to provide a rotameter comprising a first tapered vertical flow passage with cross sectional area increasing in upward direction, a second tapered vertical flow passage with cross sectional area increasing in downward direction, and a pair of flow obstructing members respectively suspend ed in the first and second tapered vertical flow passages and connected to one another by a flexible cord whereby movements of the two flow obstructing member in directions parallel to the fluid flow are coupled to one another, and input and output electrical coils disposed in a coaxial relationship to one of the first and second tapered vertical flow passages; wherein the combination of one of the two flow obstructing members and an elongated rod coaxially disposed in one of the first and second tapered vertical flow passages varies the degree of mutual electrical induction between the input and output electrical coils, and the position of the one of the two flow obstructing members is determined as a function of ratio between the input electrical signal supplied to the input electrical coil and the output electrical signal generated by the output electrical coil as a measure of the flow rate of fluid.

These and other objects of the present invention will become clear as the description thereof progresses.

BRIEF DESCRIPTION OF THE FIGURES

The present invention may be described with a greater clarity and specific by referring to the following figures:

FIG. 4 illustrates a cross section of yet another embodiment of the rotameter with remote read-out device of the present invention.

FIG. 5 illustrates a cross section of yet a further embodiment of the rotameter with remote read-out device of the present invention.

FIG. 6 illustrates a cross section of still another embodiment of the rotameter with remote read-out device of the present invention.

DESCRIPTION OF THE ILLUSTRATED EMBODIMENTS

Figures 1, 2, 3:
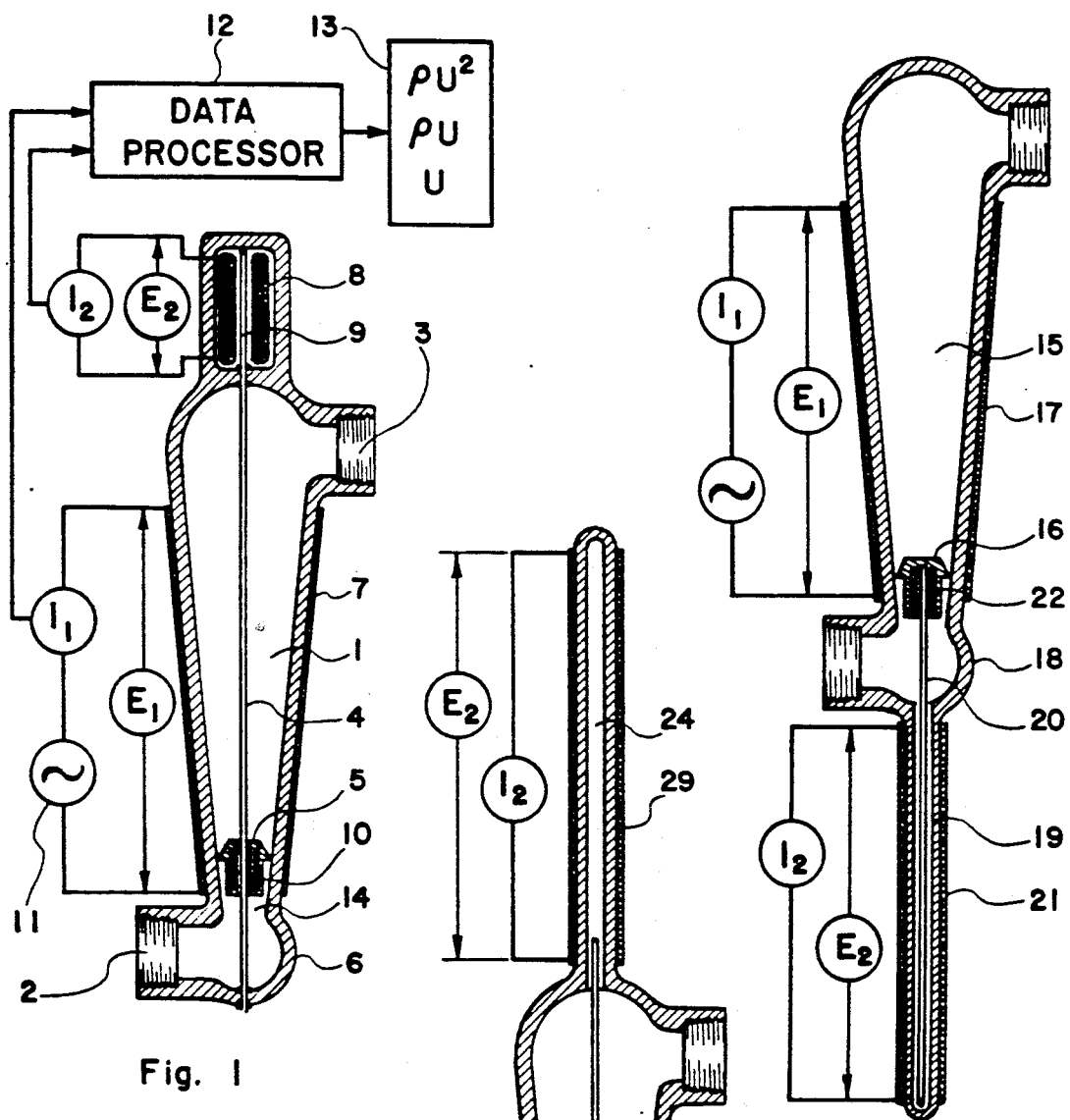
FIG. 1 illustrates a cross section of an embodiment of the rotameter with a remote read-out device constructed in accordance with the principles of the present invention.
FIG. 2 illustrates a cross section of another embodiment of the rotameter with remote read-out device of the present invention.
FIG. 3 illustrates a cross section of a further embodiment of the rotameter with remote read-out device of the present invention.

In FIG. 1 there is illustrated a cross section of the rotameter with remote read-out device of the present invention. The rotameter comprises a vertically disposed tapered flow passage 1 having a cross sectional area increasing from the bottom extremity connected to the inlet 2 to the top extremity connected to the outlet 3. An elongated rod or cord 4 is disposed coaxially within the tapered vertical flow passage 1, which engages a hole disposed coaxially through the flow obstructing member 5 in a free sliding relationship, wherein the two extremities of the elongated rod or cord 4 are secured to the rotameter body 6. A tapered input electrical coil 7 is disposed coaxially and exteriorly to the tapered flow passage 1, while an output electrical coil 8 is disposed coaxially to the input electrical coil 7 in a shifted relationship thereto. The upper extremity 9 of the elongated rod or cord 4 extending through the rotameter body 6 forms a ferromagnetic core of the output electrical coil 8, as the elongated rod or cord 4 is made of a ferromagnetic material. The flow obstructing member 5 includes an intermediary electrical coil 10 disposed coaxially to the elongated rod or cord 4, which may have the two ends thereof connected to one another forming a closed electrical coil. The alternating electrical power source 11 supplies an alternating electrical current of current $I_1$ or potential $E_1$ to the input electrical coil 7. As a result of mutual electrical induction between the input and output electrical coils 7 and 8, the output electrical coil 8 generates an alternating electrical signal of current $I_2$ or potential $E_2$ A data processor 12 determines the vertical position of the flow obstructing member 5 as a function of the ratio between $I_1$ and $I_2$ or $E_1$ and $E_2$. A flow date processor 13 determines the flow variables such as the momentum flow rate $\rho U^2$, mass flow rete $\rho U$, or flow velocity U as a function of the vertical position of the flow obstructing member provided by the data processor 11, where $\rho$ is the density of fluid. It should be understood that the electrical power source 11 may be relocated to the electrical coil 8 whereby the electrical coil 8 becomes the input electrical coil and the electrical coil 7 becomes the output electrical coil in the mutual electrical induction therebetween.

The rotameter with remote read-out device of the present invention operates on the following principles: The drag force lifting up the flow obstructing member counter balances the weight of the flow obstructing member, which condition of equilibrium of force provides equation $$\tfrac{1}{2} C_D \rho u^2 = W - \rho V. \tag{1}$$

$C_D$ is the drag coefficient of the flow obstructing member, u is the of fluid at a section of the tapered flow passage 1 located at a vertical distance from a reference section such as the inlet section 14 of the tapered flow passage 1, and W and V are respectively the weight and volume of the flow obstructing member 5. The net cross sectional area A of the flow passage, that is proportional to the cross sectional area of the tapered flow passage 1 minus the maximum cross sectional area of the flow obstructing member 5 is related to the vertical position z of the flow obstructing member by a function f $$A = f(z) A_0. \tag{2}$$

$A_0$ is the reference cross sectional area that is equal to the cross sectional area of the tapered flow passage at the inlet section 14 thereof. The mass flow rate through the cross sectional area A has to be equal to the mass flow rate through the cross sectional area $A_0$ where the fluid velocity is U $$uA = UA_0. \tag{3}$$

Elimination of u and A appearing in equation (1), (2) and (3) by forming a combination thereof provides equation $$U = f(z) \sqrt{\tfrac{2}{C_D}\left(\tfrac{W}{\rho} - V\right)}. \tag{4}$$

Equation (4) or the empirical equivalent thereof determines the fluid velocity U at the reference inlet section 14 as a function of the vertical position of the flow obstructing member when the density $\rho$ of the fluid is given or measured by a density measuring apparatus, whereupon the volume flow rate $UA_0$ or the mass flow rate $\rho UA_0$ is readily obtained since the reference cross sectional area $A_0$ is a known constant.

It is well known fact that the intensity of the magnetic field in the core region of an electrical coil induced by an alternating current energizing the coil is inversely proportional to the diameter of the electrical coil. The strength of the induction current induced in the intermediary coil 10 included in the flow obstructing member 5 is a function of the diameter of the input electrical coil 7 that varies with the vertical position z and so is the intensity of the magnetic field transmitted through the elongated rod or cord 4 and generating the output electrical signal from the output electrical coil 8. As a consequence, the ratio between the input electrical signal energizing the input electrical coil 7 and the output electrical signal from the output electrical coil 8 is a function of the vertical position z of the flow obstructing member 5

$$\frac{E_2}{E_1} = g(z) \tag{5}$$

or $$z = g^{-1}\left(\frac{E_2}{E_1}\right). \tag{6}$$

where $G^{-1}$ inverse function of g defined by equation (5). Substitution of equation (6) into equation (4) yields equation $$U = F\left(\frac{E_2}{E_1}\right) \sqrt{\tfrac{2}{C_D}\left(\tfrac{W}{\rho} - V\right)}, \tag{7}$$

where $$F\left(\frac{E_2}{E_1}\right) = f\left[g^{-1}\left(\frac{E_2}{E_1}\right)\right]. \tag{8}$$

In place of the potential ratio $E_2/E_1$, the current ratio $I_2/I_1$ or the ratio $W_2/W_1$ may be used. The function F appearing in equation (7) as well as the drag coefficient $C_D$ must be determined empirically. The data process 12 executes an algorithm defined by equation (7). It should be understood that the output electrical coil 8 may be disposed adjcaent to the lower end of the rotameter body 6, wherein the lower extremity of the elongated member 4 extends into the output electrical coil. The rotameter body 6 and the flow obstructing member 5 should be made of electrically nonconducting material.

In FIG. 2 there is illustrated a cross section of another embodiment of the rotameter with remote read-out device of the present invention, which comprises a vertically disposed flow passage 15 with the flow obstructing member 16 disposed therein and the tapered input electrical coil 17 disposed thereabout in a coaxial arrangement. The lower extremity of the rotameter body 18 has an elonagted cavity 19 disposed in a coaxial relationship to the tapered flow passage 15. An elongated rod 20 made of a ferromagnetic material with one extremity secured to the flow obstructing member 16 extends into the elongated cavity 19 in a free sliding arrangement. The output electrical coil 21 is disposed coaxially to the elongated cavity 19. In the particular illustrated embodiment, the flow obstructing member 16 includes an intermediary electrical coil 22 disposed coaxially to the elongated rod 20, which intermediary electrical coil 22 may be omitted in a modified embodiment as the embodiment shown in FIG. 2 works with or without the intermediary electrical coil 22, which operates on the principles defined by equation (7). The output electrical coil 21 may have a taper as exemplified by the embodiment shown in FIG. 5 and the combination of the flow obstructing member 16 and the elongated rod 20 may include a float counter-balancing the weight thereof as exemplified by the embodiment shown in FIG. 3 or 6.

In FIG. 3 there is illustrated a cross section of a further embodiment of the rotameter with remote read-out device of the present invention, that is a modified version of the embodiment shown in FIG. 2. The vertically disposed tapered flow passage 23 includes an elongated cavity 24 extending from the upper extremity thereof in a coaxial arrangement. The elongated rod 25 made of a ferromagnetic material with one extremity affixed to the flow obstructing member 26 suspended within the tapered flow passage 23 extends into the elongated cavity 24 in a free sliding relationship. The flow obstructing member 26 may include a float 27 of hollow construction to partially counter-balance the weigh of the combination of the flow obstructing member 26 and the elongated rod 25. The tapered input electrical coil 28 disposed coaxially to the tapered flow passage 23 has a taper disposed in a direction opposite to the direction of the taper employed in the tapered flow passage 23. The output electrical coil 29 disposed coaxially to the elongated cavity 24 may or may not have a taper as exemplified by the embodiments shown in FIG. 3 or 5. The flow obstructing member 26 may include an intermediary electrical coil 30 disposed coaxially to the elongated rod 25. In an alternative design, the intermediary electrical coil 30 may be omitted as the embodiment shown in FIG. 3 works with or without the intermediary electrical coil 30. The rotameter with remote read-out device in FIG. 3 operates on the principles set forth by equation (7).

In FIG. 4 there is illustrated a cross section of still another embodiment of the rotameter with remote read-out device of the present invention, which comprises a first tapered vertical flow passage 31 with cross sectional area increasing from the bottom to the top thereof and a second tapered vertical flow passage 32 with cross sectional area increasing from the top to the bottom thereof, which two tapered flow passages are connected to one another in series by a connecting flow passage 33 with an elongated cavity 34 disposed parallel thereto, wherein two flow obstructing members 35 and 36 respectively suspended within the two tapered flow passages 31 and 32 are connected to one another by a flexible cord 37 routed through the two tapered flow passages 31 and 32, and the elongated cavity 34, and supported by a pair of rollers 38 and 39. The first tapered flow passage 31 includes an elongated cavity 40 extending from the lower extremity thereof in a coaxial relationship, which elongated cavity 40 receives the elongated rod 41 extending from the flow obstructing member 35 that may or may not include the intermediary electrical coil 42 coaxially dispose to the elongated rod 41. The flow obstructing member 36 may include a counter-weight 43 of elongated shape, wherein the combined weight of the flow obstructing member 36 and the counter-weight 43 partially counter-balances the combined weight of the flow obstructing member 35 and the elongated rod 41. When the volume of the combination of the flow obstructing member 36 and the counter-weight 43 is matched to the volume of the combination of the flow obstructing member 35 and the elongated rod 41, the dynamic pressure of the fluid flow equal to $\frac{1}{2}\rho U^2$ is solely determined by the vertical position z of one of the two flow obstructing members 35 and 36 as equation (8) reduces to the form $$\frac{1}{2}\rho U^2 = \left[F\left(\frac{E_2}{E_1}\right)\right]^2 / C_D. \tag{9}$$

Of course, the vertical position of the flow obstructing member is determined from the ratio between input electrical signal supplied to the tapered input electrical coil 44 disposed coaxially to the tapered flow passage 31 and the output electrical signal generated by the output electrical coil 45 disposed coaxially to the elongated cavity 40, which output electrical coil 40 may not have a taper as shown by the particular illustrative embodiment or may have a taper as exemplified by the embodiment shown in FIG. 5. As an alternative to the embodiment shown in FIG. 4, the counter-weight 43 may be replaced by an elongated rod equivalent to the element 41, that extends into an elongated cavity extending from the low extremity of the tapered flow passage 32 wherein the tapered flow passage 32 now includes an input electrical coil equivalent to the element 44 and the elongated cavity extending from the lower extremity of the tapered flow passage 32 now includes an output electrical coil equivalent to the element 45. With the afore-mentioned modifications, the flow rate of fluid is determined by an equation of the following form:

$$U = \alpha F\left(\frac{E_2}{E_1}\right) - \beta G\left(\frac{E_2}{E_1}\right), \tag{10}$$

where $\alpha$ and $\beta$ are empirically determined parameters, and F and G stand for empirically determined functions having independent variables equal to the ratio between the input and output electricalsignals associated with the combinations of the input and output electrical coils respectively included in the two tapered flow passages.

In FIG. 5 there is illustrated a cross section of still a further embodiment of the rotameter with remote read-out device of the present invention, which comprises a vertically disposed tapered flow passage 46 including an elongated cavity 47 extending from the upper extremity of the tapered flow passage in a coaxial relationship, which elongated cavity receives the elongated rod 48 extending from the flow obstructing member 49 suspended within the tapered flow passage. One extremity of the elongated rod 48 affixed to the flow obstructing member 49 includes the first half 50 of the intermediary electrical coil, while the other extremity thereof disposed within the elongated cavity 47 includes the second half 51 of the intermediary electrical coil, wherein the first and second half of the intermediary electrical coil wound in the same direction about the elongated rod 48 are connected to one another by lead wires routed through the hollow core of the elongated rod 51. The upper extremity of the elongated rod 48 may include a float 52 partially counter-balancing the combined weight of the flow obstructing member 49 and the elongated rod 48. The tapered input electrical coil 53 is disposed coaxially to the tapered flow passage 46, while the tapered output electrical coil 54 is disposed coaxially to the elongated cavity 47. The sensitivity of the rotameter is enhanced by the combination of the two tapered electrical coils 51 and 52 tapering in the same direction and respectively extending over the length of the tapered flow passage and the elongated cavity 47. The feature including the tapered output electrical coil and/or the intermediary electrical coil with two halves respectively disposed at the two extremities of the elongated rod 48 may be also incorporated into the embodiments shown in FIGS. 1, 2, 3, 4 and 6.

In FIG. 6 there is illustrated a cross section of yet another embodiment of the rotameter with remote read-out device, that has a construction essentially the same as that of the embodiment shown in FIG. 2 with a few exceptions, which exception includes, firstly, the float 55 affixed to one extremity of the elongated rod 56 opposite to the other extremity affixed to the flow obstructing member 57. In this particular arrangement, the intermediary electrical coil 58 is disposed at the extremity of the elongated rod 56 opposite to the extremity thereof affixed to the flow obstructing member 57 that may be made of a ferromagnetic material as it does not include an intermediary electrical coil. As shown in the embodiment shown in FIG. 5, the intermediary electrical coil may be divided into two halves respectively disposed at the two extremities of he elongated rod 56 and connected to one another by lead wires routed through the hollow core of the elongated rod 56. As an alternative in design, the taper in the input electrical coil 59 may be omitted and the output electrical coil 60 may have a tapered construction.

While the principles of the present invention have now been made clear by the illustrative embodiments, there will be many modifications of structures, arrangements, proportions, elements and materials, which are obvious to those skilled and particularly adapted to the specific working environments and operating conditions in the practice of the invention without departing from the principles of the present invention. It is not desired to limit the invention to the particular illustrative embodiments shown and described and accordingly, all suitable modifications and equivalents may be resorted to falling within the scope of the invention as defined by the claims which follow. Claims The embodiments of the invention, in which an exclusive property or priviledge is claimed, are defined as follows:

1. A device for measuring rate of fluid flow comprising in combination:
    a) a body including a vertically disposed tapered flow passage with cross sectional area increasing from a bottom inlet to a top outlet of the tapered flow passage, and an elongated cavity disposed in an in-line relationship to the tapered flow passage;
    b) a flow obstructing member disposed within the tapered flow passage in a suspended arrangement and an elongated member disposed within the tapered flow passage in a coaxial arrangement, wherein the elongated member extends at least from the flow obstructing member into the elongated cavity;
    c) a first electrical coil wound on and extending over a length of the tapered flow passage, and a second electrical coil disposed coaxially to and extending over a length of the elongated cavity, wherein at least one of the first and second electrical coils is tapered;
    d) means for measuring degree of mutual electrical induction between the first and second electrical coils; and
    e) means for determining vertical position of the flow obstructing member relative to a reference section of the tapered flow passage as a function of said degree of mutual electrical induction as a measure of flow rate of fluid moving through the tapered flow passage.

2. A combination as set forth in claim 1 wherein the elongated member is secured to the body at at least one extremity thereof and extends through a hole included in the flow obstructing member in a coaxial and free-sliding relationship.

3. A combination as set forth in claim 2 wherein the flow obstructing member includes an intermediary electrical coil disposed in a coaxial arrangement to the elongated member.

4. A combination as set forth in claim 1 wherein the elongated member is affixed to the flow obstructing member at one extremity thereof and the other extremity opposite to said one extrmeity extends into the elongated cavity.

5. A combination as set forth in claim 4 wherein the elongated member includes an intermediary electrical coil disposed at said one extremity thereof in a coaxial arrangement thereto.

6. A combination as set forth in claim 5 wherein the elongated member includes another intermediary electrical coil disposed at said the other extremity thereof in a coaxial arrangement thereto.

7. A combination as set forth in claim 6 wherein said an and another intermediary electrical coils are electrically connected to one another.

8. A combination as set forth in claim 7 wherein the combination of the flow obstructing member and the elongated member includes a float partially counter-balancing combined weight of the flow obstructing member and the elongated member.

9. A combination as set forth in claim 5 wherein the combination of the flow obstructing member and the elongated member includes a float partially counterbalancing combined weight of the flow obstructing member and the elongated member.

10. A combination as set forth in claim 4 wherein the elongated member includes an intermediary electrical coil disposed at said the other extremity thereof in a coaxial arrangement thereto.

11. A combination as set forth in claim 10 wherein the combination of the flow obstructing member and the elongated member includes a float partially counterbalancing combined weight of the flow obstructing member and the elongated member.

12. A combination as set forth in claim 1 wherein said combination include another vertically disposed tapered flow passage with cross sectional area increasing from a top inlet to a bottom outlet of said another tapered flow passage, wherein the top outlet of said a tapered flow passage is connected to the top inlet of said another tapered flow passage, and a flow obstruct member disposed within said another tapered flow passage in a suspended arrangement; wherein the two flow obstructing members respectively disposed within said a and another tapered flow passages are tethered to one another by a flexible elongated member coupling movements of the two flow obstructing members to one another in directions parallel to direction of the fluid 13. A combination as set forth in claim 12 wherein the elongated member disposed within said a tapered flow passage is affixed to the flow obstructing member at one extremity thereof and the other extremity opposite to said one extremity extends into the elongated cavity.

14. A combination as set forth in claim 13 wherein the elongated member disposed within said a tapered flow passage includes an intermediary electrical coil disposed at said one extremity thereof in a coaxial arrangement thereto.

15. A combination as set forth in claim 14 wherein the elongated member disposed within said a tapered flow passage includes another intermediary electrical coil disposed at said the other extremity thereof in a coaxial arrangement thereto, wherein said an and another intermediary electrical coils are electrically connected to one another.

16. A device for measuring rate of fluid flow comprising in combination:
a) a body including a vertically disposed tapered flow passage with cross sectional area increasing from a bottom inlet to a top outlet of the tapered flow passage;
b) an elongated member disposed within the tapered flow passage in a coaxial arrangement and secured to the body, wherein one extremity of the elongated member extends out of the tapered flow passage;
c) a flow obstructing member with a through hole disposed within the tapered flow passage in a suspended arrangement, wherein the elongated member extends through the through hole in a free-sliding relationship;
d) a first electrical coil wound on and extending over a length of the tapered flow passage, and a second electrical coil wound on and extending over a length of said one extremity of the elongated member wherein at least one of the first and second electrical coils is tapered;
e) means for measuring degree of mutual electrical induction between the first and second electrical coils; and
f) means for determining vertical position of the flow obstructing member relative to a reference section of the tapered flow passage as a function of said degree of mutual electrical induction as a measure of flow rate of fluid moving through the tapered flow passage 17. A combination as set forth in claim 16 wherein the flow obstructing member includes an intermediary electrical coil disposed in a coaxial arrangement to the elongated member.

18. A device for measuring rate of fluid flow comprising in combination:
a) a body including a first vertically disposed tapered flow passage with cross sectional area increasing from a bottom inlet to a top outlet of the first tapered flow passage, and a second vertically disposed tapered flow passage with cross sectional area increasing from a top inlet to a bottom outlet of the second tapered flow passage; wherein the top outlet of the first tapered flow passage is connected to the top inlet of the second tapered flow passage;
b) a first flow obstructing member disposed within the first tapered flow passage in a suspended arrangement, and a second flow obstructing member disposed within the second tapered flow passage in a suspended arrangement; wherein the first and second flow obstructing members are tethered to one another by a flexible elongated member coupling movements of the first and second flow obstructing members to one another in directions parallel to direction of the fluid flow;
c) at least one elongated member with one extremity affixed to one of the first and second flow obstructing members disposed within one of the first and second tapered flow passages including said flow obstructing member in a coaxial arrangement, and extending into an elongated cavity extending from one extremity of said tapered flow passage in a coaxial arrangement;
d) a first electrical coil wound on and extending over a length of one said tapered flow passage, and a second electrical coil wound on and extending over a length of the elongated cavity, wherein at least one of the first and second electrical coils is tapered;
e) means for measuring degree of mutual electrical induction between the first and second electrical coils; and
f) means for determining vertical position of said flow obstructing member relative to a reference cross section of said tapered flow passage as a function of said degree of mutual electrical induction as a measure of flow rate of fluid moving through said tapered flow passage.

19. A combination as set forth in claim 18 wherein said elongated member includes an intermediary electrical coil disposed at said one extremity thereof in a coaxial arrangement thereto.

20. A combination as set forth in claim 19 wherein said elongated member another intermediary electrical coil disposed at the other extremity to said one extremity in a coaxial arrangement thereto, wherein said an and another intermediary electrical coils are electrically connected to one another.

* * * * *